United States Patent
Schroeder et al.

(10) Patent No.: US 9,135,643 B2
(45) Date of Patent: Sep. 15, 2015

(54) SYSTEM AND METHOD FOR TARGETING USERS FOR CONTENT DELIVERY

(75) Inventors: Bryan Schroeder, Sacramento, CA (US); Shane Wiley, Scottsdale, AZ (US); Amir Cory, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 875 days.

(21) Appl. No.: 12/699,150

(22) Filed: Feb. 3, 2010

(65) Prior Publication Data

US 2011/0191185 A1 Aug. 4, 2011

(51) Int. Cl.
*G06Q 30/00* (2012.01)
*G06Q 30/02* (2012.01)

(52) U.S. Cl.
CPC .................... *G06Q 30/0261* (2013.01)

(58) Field of Classification Search
None
See application file for complete search history.

(56) References Cited

U.S. PATENT DOCUMENTS

| | | | | |
|---|---|---|---|---|
| 2001/0023408 A1* | 9/2001 | Mc.Evoy et al. | | 705/14 |
| 2003/0004787 A1* | 1/2003 | Tripp et al. | | 705/10 |
| 2005/0044061 A1* | 2/2005 | Klemow | | 707/1 |
| 2005/0187823 A1* | 8/2005 | Howes | | 705/14 |
| 2005/0256766 A1* | 11/2005 | Garcia et al. | | 705/14 |
| 2008/0097828 A1* | 4/2008 | Silverbrook et al. | | 705/10 |
| 2008/0306884 A1* | 12/2008 | Weinberg et al. | | 705/410 |
| 2009/0099927 A1* | 4/2009 | Stewart et al. | | 705/14 |
| 2009/0234715 A1* | 9/2009 | Heiser et al. | | 705/10 |
| 2009/0248520 A1* | 10/2009 | Ku | | 705/14 |
| 2009/0313114 A1* | 12/2009 | Arampatzis | | 705/14.45 |
| 2010/0049557 A1* | 2/2010 | Rojas et al. | | 705/7 |
| 2010/0205562 A1* | 8/2010 | de Heer | | 715/810 |
| 2011/0119137 A1* | 5/2011 | Morsa | | 705/14.71 |

* cited by examiner

*Primary Examiner* — Matthew T Sittner
(74) *Attorney, Agent, or Firm* — Mauriel Kapouytian Woods LLP; Lana Akopyan; James Woods

(57) ABSTRACT

Methods, systems and computer program products are provided for targeting users for content provision. In one method, the method receives at a server, one or more content objects and one or more ZIP+4 codes as targeting parameters for the one or more content objects. The method retrieves personal information of a plurality of users. The method then identifies one or more of the plurality of users located in geographic areas corresponding to the one or more ZIP+4 codes based, at least in part, on the personal information. Subsequently, the method targets a content object of the one or more content objects to the one or more of the plurality of users based on the identified geographic areas of the users and the ZIP+4 codes associated with corresponding ones of the one or more content objects.

23 Claims, 6 Drawing Sheets

SYSTEM AND METHOD FOR TARGETING USERS FOR CONTENT DELIVERY

TECHNICAL FIELD

The present disclosure generally relates to online targeted content delivery.

BACKGROUND

The internet is a powerful tool for marketers to reach out to a large audience. The internet provides powerful targeted content provision methods such as contextual targeting, behavioral targeting, psychographic targeting, demographic targeting, geographic targeting and the like. Targeted content provision methods enable marketers to reach out to the relevant audience and thus improve their conversion rates, while keeping marketing costs in check.

Geographic targeting, also called geo-targeting or geo-marketing is the method of determining the geographic location (the physical location) of a website visitor and delivering different content to that visitor based on his or her location, such as country, region/state, city, metro code/zip code. The geographic location of the website visitor may be derived using information such as Internet Protocol (IP) address, Internet Service Provider (ISP), traceroute, and the like. Such information may be derived from click stream data, cookies, Hyper Text Transfer Protocol (HTTP) request headers, server traffic logs.

However, such methods to determine the geographic location may be complex, computing intensive and often inaccurate. IP addresses are constantly being assigned, allocated, reallocated, moved and changed due to changes in internet infrastructure, users having IP addresses dynamically assigned or users moving from one network to another, and so forth. In order to keep up with these changes IP spidering and finely tuned delivery mechanisms may be employed. IP spidering includes complex algorithms, bandwidth measurement and mapping technology to periodically identify IP address changes.

Further, marketers may desire to exchange information about customers that they have in common. This may help the marketers to augment their knowledge of their customers and thus improve geographic targeting. However, the information about customers, specifically Personally Identifiable Information (PII) of the customers, held by marketers may often be confidential. PII includes any information which uniquely identifies the customer, such as the customer's e-mail address, social security number (SSN), mobile phone number, customer's name, mailing address, date of birth, and the like. The customer's PII may be subject to privacy regulations, or the marketer may have a contractual obligation not to disclose its customers' PII. Further, marketers may decide not to share their customers' PII with other entities due to business considerations irrespective of regulations or contractual obligations. For example, the marketer may want to be viewed as an organization that maintains a high level of customer privacy.

SUMMARY

In particular embodiments, the present invention provides methods, systems and computer program products for targeting users for advertising and other content based on ZIP+4 parameters. In one method, the method receives at a server, one or more content objects and one or more ZIP+4 codes as targeting parameters for the one or more content objects. The method retrieves personal information of a plurality of users. The method then identifies one or more of the plurality of users located in geographic areas corresponding to the one or more ZIP+4 codes based, at least in part, on the personal information. Subsequently, the method targets a content object of the one or more content objects to the one or more of the plurality of users based on the identified geographic areas of the users and the ZIP+4 codes associated with corresponding ones of the one or more content objects.

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Particular embodiments of the present invention provide methods, systems and computer program products for targeting users for content provision. In one method, the method receives at a server, one or more ZIP+4 codes. The method accesses personal information of a plurality of users. The method then identifies one or more of the plurality of users located in geographic areas corresponding to the one or more ZIP+4 codes based, at least in part, on the personal information. Subsequently, the method compiles a target user list using the personal information; wherein the target user list comprises user identifiers of the one or more users.

Example Network Environment

Figure 1:
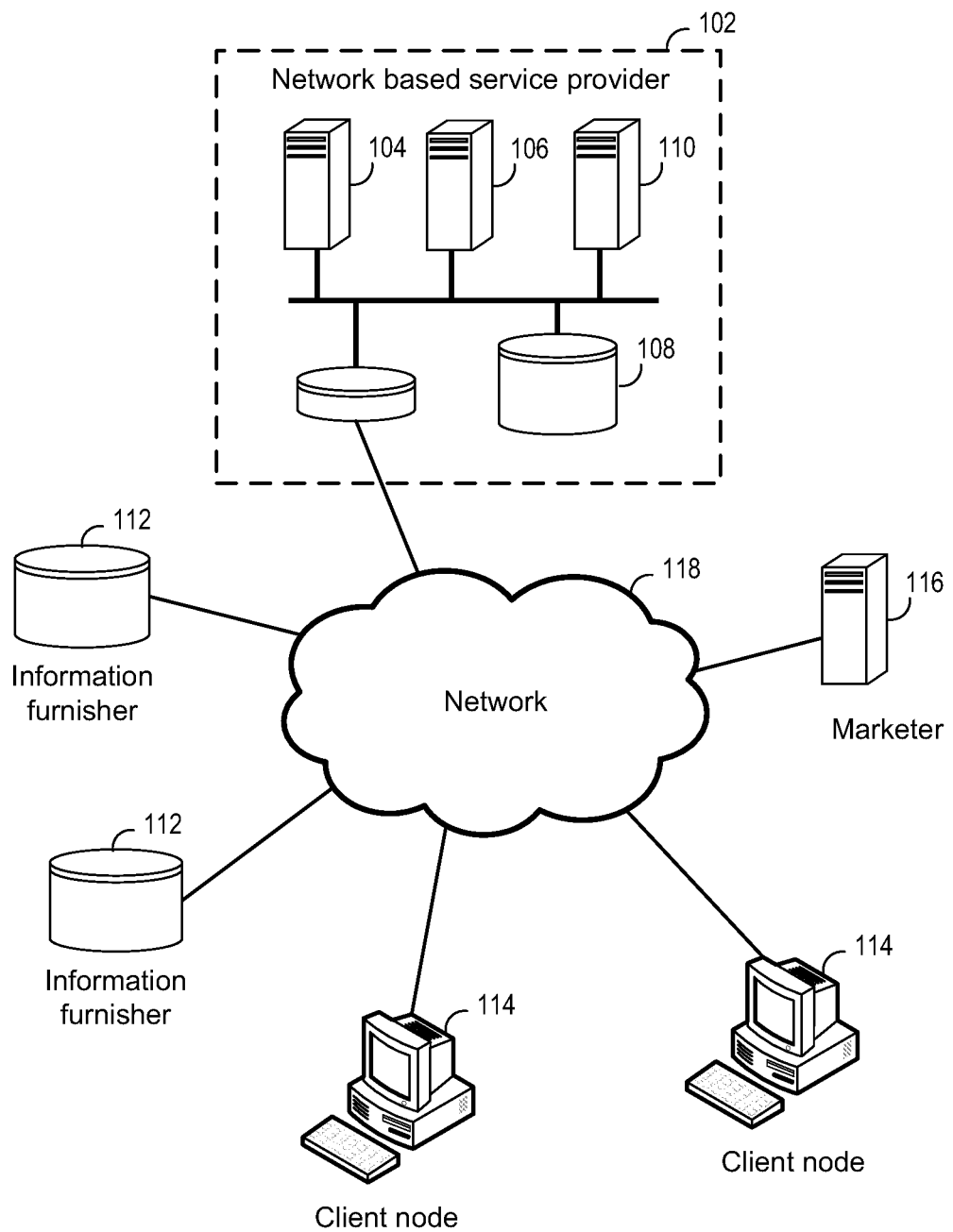
FIG. 1 illustrates an example network environment in which particular implementations may operate.

FIG. 1 illustrates an implementation of a network environment 100 in which particular implementations of the invention may be deployed according to one embodiment. Network environment 100 includes a network based service provider 102, one or more information furnishers 112, one or more client nodes 114, one or more marketers 116 and a network 118. Network based service provider 102 includes a registration and authentication server 104, one or more application servers 106, a user information database 108, and a ZIP+4 targeting system 110. Network 118 generally represents one or more interconnected networks, over which network based service provider 102, information furnisher 112, and client node(s) 114 can communicate with each other. Network 118 may include packet-based wide area networks (such as the Internet), local area networks (LAN), private networks, wireless networks, satellite networks, cellular networks, paging networks, and the like. A person skilled in the art will recognize that network 118 may also be a combination of more than one type of network. For example, network 118 may be a combination of a LAN and the Internet. In addition, network 118 may be implemented as a wired network, or a wireless network or a combination thereof. Client node(s) 114 are communicatively coupled to network 118 via a network service provider or any other suitable methods known in the art.

Network Based Service Provider

Network based service provider 102 is a network addressable system that hosts an online service accessible over network 118, to one or more users using client node(s) 114. In various embodiments, the online service may be a search engine, a news service, a content sharing service, an e-mail service, a blog website, a social networking service, a business networking service, an online job portal, a news provider, an entertainment provider, an e-shopping website (such as online stores), an e-banking or e-finance website, an e-health website, a Usenet service, and the like. In other words, the online service may be any service that allows the users to register with network based service provider 102 to use the online service.

The registration and authentication server 104 facilitates registration of new users to the network application, and authenticates existing users at sign-in. Registration and authentication server 104 may provide a registration web form to users wishing to register for the online service(s). The registration web form may prompt the user to select a desired user identifier and to provide personal information such as, but not limited to, a first name, a last name, a gender, a zip code, a ZIP+4 code and an address of the user. The user identifier may be an email address, a username, a screen name, a user identity (ID), an open ID Uniform Resource Locator (URL) and an alias name and the like. In some embodiments, the registration and authentication server 104 uses security protocols such as Secure Sockets Layer (SSL), Transport Layer Security (TLS) or GnuTLS. Registration and authentication server 104 then provisions user identifiers to users that register with the online service hosted by network based service provider 102. Registration and authentication server 104 stores the personal information of the user and the user identifier provisioned to the user in user information database 108. Database 108 may be implemented using any known database solution such as a Relational Database Management System (RDBMS), an Extensible Markup Language (XML) database, a flat file database, and the like.

One or more application server(s) 106 host web pages and applications implemented using Common Gateway Interface script (CGI), PHP: Hyper-text Processor (PHP), Active Server Pages (ASP), Hyper Text Markup Language (HTML), Extensible Markup Language (XML), Java and the like. Application server(s) 106 provide network application access to client node(s) 114 after registration and authentication at registration and authentication server 104.

In various embodiments, application server(s) 106 may present targeted content to the users. The targeted content may be presented to the users on the web pages associated with the online service(s) hosted by network based service provider 102, or in communication such as email and online newsletters sent by network based service provider 102. The content may be targeted based on criteria such as, but not limited to, demographic criteria, psychographic criteria, behavioral criteria, geographic criteria and technographic criteria. In some embodiments, the targeted content is advertising or promotional content.

ZIP+4 Targeting System

ZIP+4 targeting system 110 provides targeting mechanisms for presenting targeted content to the users. ZIP+4 targeting system 110 uses the user registration information stored in user information database 108 to provide the targeted content to the users. Particularly, ZIP+4 targeting system 110 uses the ZIP+4 codes of the users stored in the user information database 108 to provide targeted content to the users. In the case that the ZIP+4 of the user is not available in the user information database 108, ZIP+4 targeting system 110 obtains the ZIP+4 code of the user from information furnisher(s) 112. ZIP+4 targeting system 110 may use the user's personal information such as address, city, state, and zip code to retrieve the ZIP+4 code of the user. The user's address is required to retrieve the ZIP+4 code of the user. In some embodiments when the user's address is not available, ZIP+4 targeting system 110 may use the user's personal information such as name, last name, city, state, company name, and zip code to retrieve the user's address from information furnisher(s) 112. ZIP+4 targeting system 110 may then use the retrieved address to retrieve the ZIP+4 code from the same or another information furnisher(s) 112. The retrieved ZIP+4 code of the user is appended to the user's personal information in the user information database 108.

In various embodiments, ZIP+4 targeting system 110 may include a privacy protection module (not shown in the figure). The privacy protection module notifies the user of the retrieval of the user's ZIP+4 code from information furnisher(s) 112, using of the user's personal information. The privacy protection module may also present an option to the user, to opt out of the ZIP+4 code append process. In some embodiments, ZIP+4 targeting system 110 may retrieve the user's address, city, state, zip code or ZIP+4 code from other online services that the user has subscribed to. ZIP+4 targeting system 110 may require authorization from the user to obtain such information from the other online services. In an embodiment, network based service provider 102 implements a widget to obtain the personal information of the user. The user may activate the widget, select the other online services that the user has subscribed to, and authorize network based service provider 102 to obtain the personal information of the user from the other online services.

ZIP+4 targeting system 110 utilizes the ZIP+4 codes to anonymously target users for content provision. The use of ZIP+4 codes, as a targeting method, may not be as accurate as household level targeting. However, the use of ZIP+4 codes ensures that no personally identifiable information of the users is exchanged with marketer(s) 116 and information furnisher(s) 112, for targeted content provision.

In some embodiments, ZIP+4 targeting system 110 uses a list of ZIP+4 codes as the input for providing targeted content to the users. In such embodiments, ZIP+4 targeting system 110 functions as an online extension to the direct mail marketing campaign of marketer(s) 116. Marketer(s) 116 may already have a direct mail marketing campaign in place and may wish to employ the direct mail marketing campaign for online users. Marketer(s) 116 send the ZIP+4 codes, corresponding to the target audience of the direct mail marketing campaign, to ZIP+4 targeting system 110.

In other embodiments, ZIP+4 targeting system 110 may receive targeting criteria such as demographic segments, psychographic segments, behavioral segments, and technographic segments from marketer(s) 116. ZIP+4 targeting system 110 may then send the targeting criteria to information furnisher(s) 112, to retrieve ZIP+4 codes satisfying the targeting criteria. ZIP+4 targeting system 110 may also receive a match threshold from marketer(s) 116. The match threshold is an indication of a minimum number of households or individuals in each ZIP+4 code required to satisfy the targeting criteria. ZIP+4 targeting system 110 may send the match threshold along with the targeting criteria to information furnisher(s) 112, to retrieve ZIP+4 codes satisfying the targeting criteria and confirming to the match threshold. The match threshold represents a precision-reach tradeoff of the segmentation model. The match threshold indicates the level of precision or the level of reach required for providing targeted content. For example, consider an insurance product targeted at households or individuals having a household income exceeding $150,000. A high precision market segmentation including ZIP+4 codes with four households having a household income exceeding $150,000, would reach a smaller number of users as compared to a low precision market segmentation including ZIP+4 codes with two or more households having a household income exceeding $150,000. An example process for retrieving ZIP+4 codes from information furnisher(s) 112 using the targeting criteria is described in conjunction with FIG. 3.

In an embodiment, ZIP+4 targeting system 110 may receive an actual match number from information furnisher(s) 112, for each ZIP+4 code satisfying the targeting criteria. The actual match number is the actual number of households or individuals in each ZIP+4 code satisfying the targeting criteria. A data refinement module (not shown in the figure) implemented by network based service provider 102 may then identify from among the received ZIP+4 codes, the ZIP+4 codes for which the actual match number is equal to or exceeds the match threshold. The data refinement module then sends the identified ZIP+4 codes to ZIP+4 targeting system 110 for further processing.

ZIP+4 targeting system 110 receives ZIP+4 codes from information furnisher(s) 112 or marketer(s) 116, depending on the implementation scenario. ZIP+4 targeting system 110 also receives one or more content objects to be presented to the users. The content object may be, without limitation, an image, text, an animated banners such as Flash™ object or a Graphic Interchange Format (GIF) image, videos, sound clips, a web page and a Universal Resource Locator (URL). In an embodiment, the content objects may have metadata associated with the content objects. The metadata may be used to indicate the context of the content object or the subject matter of the content object. ZIP+4 targeting system 110 then identifies the users residing in geographic areas corresponding to the received ZIP+4 codes. ZIP+4 targeting system 110 uses the personal information of the users stored in the user information database 108 to identify the users residing in the ZIP+4 codes. ZIP+4 targeting system 110 may use any database querying technique known in the art, such as, but not limited to, Structure Query Language (SQL). ZIP+4 targeting system 110 then compiles a target user list containing the user identifiers of the identified users. The user identifiers may include an email address, a username, a screen name, a user identity (ID), an open ID Uniform Resource Locator (URL) and an alias name.

Subsequently, ZIP+4 targeting system 110 associates the target user list with the content objects. In some embodiments, ZIP+4 targeting system 110 may receive the ZIP+4 codes as targeting parameters for the content objects, from marketer(s) 116. ZIP+4 targeting system 110 may then directly associate the content objects with the user identifiers in the target user list. In other embodiments, ZIP+4 targeting system 110 may use the correlation between the targeting criteria received from marketer(s) 116 and the ZIP+4 codes received from information furnisher(s) 112 to associate the content objects to the ZIP+4 codes. ZIP+4 targeting system 110 may then associate the same content objects to the users in the same ZIP+4 code. ZIP+4 targeting system 110 may use the metadata of the content objects to associate the target user list with the content objects.

Information Furnishers

Information furnisher(s) 112 are sources that may possess information associated with users and/or ZIP+4 codes. Information furnisher(s) 112 may include, without limitation, publicly available sources such as the United States Bureau of Labor Statistics, consumer reporting agencies such as Experian, postal code databases such as the United States Postal Service zip code database, and the like. Publicly available information furnisher(s) 112 may posses information such as, but not limited to, geographic information such as ZIP+4 codes of the users; demographic information including, occupation, socio-economic status; psychographic information such as sporting and entertainment interests, information on pets owned, travel and leisure trip information, hi-tech goods owned or interested in, vehicles owned or interested in, information related to use of beauty and cosmetic products, charities supported, and the like; behavioral information such as purchasing behavior of users, brand loyalty, media consumption behavior such as TV viewing, news media subscriptions, and the like; attitudinal information such as distinctive attitudes, traits and motivations of the users; technological information such as technology usage patterns, attitudes about technology and so forth. Publicly available information furnisher(s) 112 may posses possess information at a household level or at an individual level. Information furnisher(s) 112 may identify households or individuals satisfying the targeting criteria received from ZIP+4 targeting system 110. Information furnisher(s) 112 may then send the ZIP+4 codes of the identified households or individuals, to ZIP+4 targeting system 110. Information furnisher(s) 112 may also send a number of households or individuals in each of the ZIP+4 codes that satisfy the targeting criteria, to ZIP+4 targeting system 110.

Information furnisher(s) 112 may also include other online services including, but not limited to, online job portals such as Yahoo! HotJobs®, social networking websites such as LinkedIn® and Facebook®. Such online services may posses information such as the address of the user that may be used to identify the user's ZIP+4 code, information about the user's interests and hobbies, the user's academic and career path and objectives, and the like. In various embodiments, the users may need to authorize ZIP+4 targeting system 110 to obtain the personal information from information furnisher(s) 112.

Client Nodes

Client node(s) 114 is a computing device from which a user accesses the services provided by the network based service provider 102. Client node(s) 114 has the capability to communicate over network 118. Client node(s) 114 further has the capability to provide the user an interface to interact with the service provided by network based service provider 102. Client node(s) 114 may be, for example, a desktop computer, a laptop computer, a mobile phone, a personal digital assistant, and the like. A client node may execute one or more client applications such as, without limitation, a web browser to access and view content over a computer network, an email client to send and retrieve emails, an instant messaging client for communicating with other users, and a File Transfer Protocol (FTP) client for file transfer. Client node(s) 114, in various embodiments, may include a Wireless Application Protocol (WAP) browser or other wireless or mobile device protocol suites such as, without limitation, NTT DoCoMo's i-mode wireless network service protocol suites, EDGE, and the like.

Marketers

Marketer(s) 116 are entities that wish to promote, market or advertise the products and/or services offered by the entities. Marketer(s) 116 may have a direct mail marketing campaign in place, and may utilize ZIP+4 targeting system 110 as an online extension to the direct mail marketing campaign. Embodiments of the invention described herein allow marketer(s) 116 to specify targeting criteria using ZIP+4 codes. For example, marketer(s) 116 based on their own analysis or research may know what types of users it (they) wish to target, but may not (or can not) share the actual identities of those users with a third party advertising or content targeting system. Accordingly, marketer(s) 116, in some implementations, provide ZIP+4 codes as targeting parameters in association with one or more content objects, such as banner ads and the like. Marketer(s) 116 may also provide the match threshold to ZIP+4 targeting system 110, to have a specific degree of precision or a specific level of reach of the marketing campaign. Marketer(s) 116 may pay fees to network based service provider 102, for the use of ZIP+4 targeting system 110. Any payment model such as, but not limited to, pay-per-click, pay-per-view, flat fee, and the like, known in the art, may be used for paying the fees.

Although FIG. 1 illustrates the foregoing systems as separate systems, the functionality represented by each system may be combined into other systems. Furthermore, the functionality represented by each depicted system may be further separated. Still further, implementations of the present invention may operate in network environments that include multiples of one or more of the individual systems and sites disclosed herein. In addition, other implementations may operate in network environments where one or more of the systems described herein have been omitted.

Process

Figure 2:
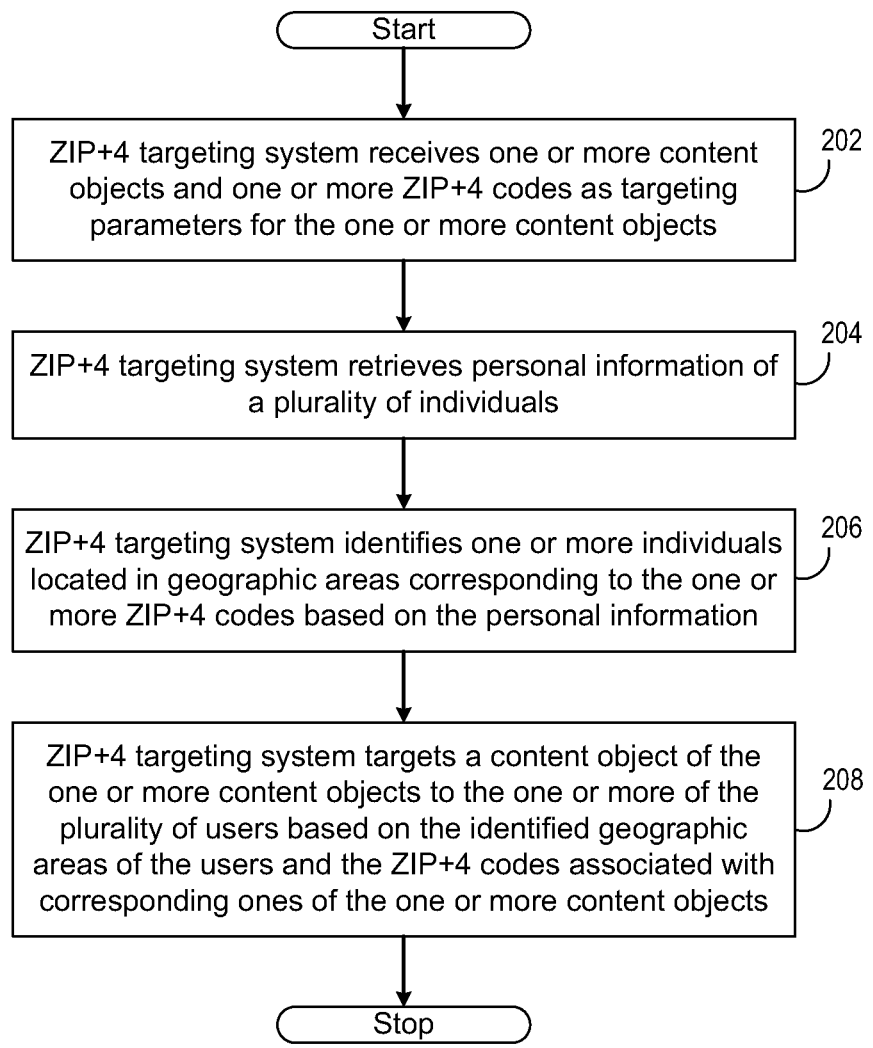
FIG. 2 is a flowchart illustrating an example method for targeting content to users, according to one embodiment.

FIG. 2 is a flowchart illustrating an exemplary process 200 for targeting content to users.

At step 202, ZIP+4 targeting system 110 receives one or more content objects and one or more ZIP+4 codes as targeting parameters for the one or more content objects. ZIP+4 targeting system 110 may receive the content objects from marketer(s) 116. The content objects may be without limitation, image, text, animated banners such as Flash™, videos and sound clips. ZIP+4 targeting system 110 may receive the content objects by various methods, such as, but not limited to, File Transfer Protocol (FTP) transfers, direct upload to the network based service provider 102's servers, and the like. Depending on the implementation scenario, ZIP+4 targeting system 110 may receive the ZIP+4 codes from marketer(s) 116 or from information furnisher(s) 112. ZIP+4 targeting system 110 may receive the ZIP+4 codes in one of various digital file formats such as, but not limited to, Comma Separated Values (CSV), Tab separated data file (TAB), Data Interchange Format (DIF), a Data file (DAT), a spreadsheet, a text file (TXT), and the like. ZIP+4 targeting system 110 may also have a proprietary digital file format for receiving the ZIP+4 codes. Further, the digital file may be encrypted using encryption techniques known in the art, to enhance the security of ZIP+4 targeting system 110. In various embodiments, the ZIP+4 codes may be in the format of a five digit ZIP code followed by a four digit ZIP+4 code. The ZIP code and ZIP+4 code may or may not be separated by a separator such as a hyphen. Subsequent to receiving the digital file, ZIP+4 targeting system 110 may decrypt the digital file, extract and load the ZIP+4 codes into ZIP+4 targeting system 110, to compose queries for searching user information database 108.

At step 204, ZIP+4 targeting system 110 retrieves the personal information of a plurality of users from user information database 108. ZIP+4 targeting system 110 may use any database querying technique known in the art, such as using SQL to identify and retrieve the personal information of all users that have not opted out of the ZIP+4 targeting process, and for whom ZIP+4 codes are known by ZIP+4 targeting system 110.

At step 206, ZIP+4 targeting system 110 identifies the users located in geographic areas corresponding to the received ZIP+4 codes. ZIP+4 targeting system 110 may query user information database 108, to identify the users located in the ZIP+4 codes. ZIP+4 targeting system 110 uses the ZIP+4 codes as values of an argument in the query to search user information database 108. The query may be designed to search in the ZIP code field or ZIP+4 code field of user information database 108.

At step 208, ZIP+4 targeting system 110 targets a content object of the one or more content objects to the one or more of the plurality of users based on the identified geographic areas of the users and the ZIP+4 codes associated with corresponding ones of the one or more content objects. In other words, ZIP+4 targeting system 110 may map the content objects received in step 202 to the users identified in step 206, based on the commonality between the ZIP+4 codes received as targeting parameters of the content objects and the ZIP+4 codes associated with the geographic areas of the users.

Subsequent to the process described above, ZIP+4 targeting system 110 may provide the content objects to the users of the online services hosted by network based service provider 102. An example process 500 of providing the content objects to the users is described in conjunction with FIG. 5.

In the exemplary process described above, separate database queries are used at each step of the process. However, a person skilled in the art will appreciate that the above exemplary process may also be implemented by combining one or more of the separate queries.

Figure 3:
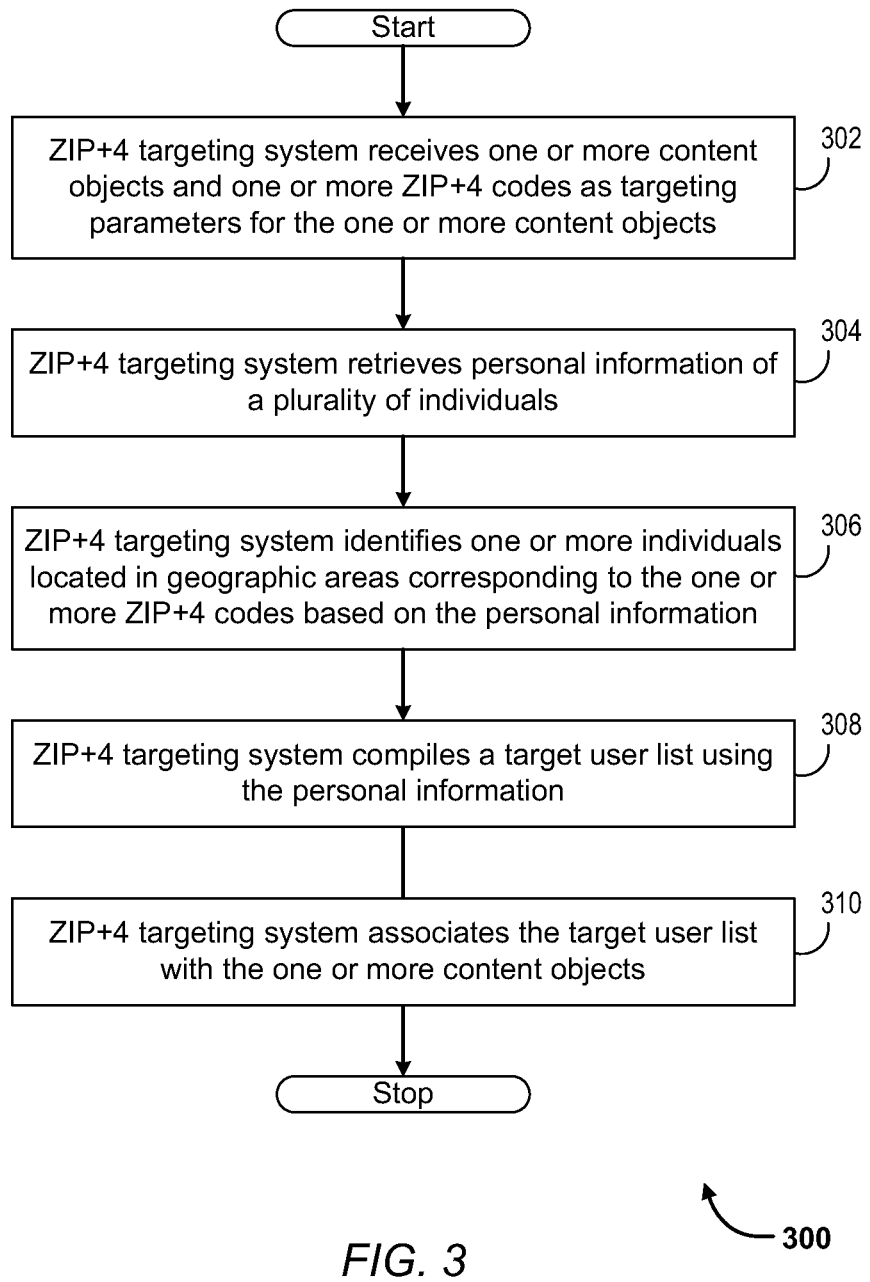
FIG. 3 is a flowchart illustrating an example method for targeting users for content provision, according to one embodiment.

FIG. 3 is a flowchart illustrating an exemplary process 300 for targeting users for content delivery.

At step 302, ZIP+4 targeting system 110 receives one or more content objects and one or more ZIP+4 codes as targeting parameters for the one or more content objects, similar to step 202 of process 200 for targeting content to users described in conjunction with FIG. 2.

At step 304, ZIP+4 targeting system 110 retrieves the personal information of a plurality of users from user information database 108, similar to step 204 of process 200 for targeting content to users described in conjunction with FIG. 2.

At step 306, ZIP+4 targeting system 110 identifies the users located in geographic areas corresponding to the received ZIP+4 codes, similar to step 206 of process 200 for targeting content to users described in conjunction with FIG. 2.

At step 308, ZIP+4 targeting system 110 compiles a target user list using the personal information of the users identified in step 306. The target user list contains the user identifiers of the identified users and the ZIP+4 codes corresponding to the geographic location of the identified users. In some embodiments, ZIP+4 targeting system 110 may compile multiple target user lists—one for each ZIP+4 code. The target user list may be in one of various digital file formats such as, but not limited to, CSV, TAB, DIF, DAT, TXT, a spreadsheet, and the like. The target user list may also have a proprietary digital file format. The digital file format of the target user list may be chosen to allow compatibility with existing content targeting systems used by network based service provider 102.

At step 310, ZIP+4 targeting system 110 associates the target user list with the one or more content objects. ZIP+4 targeting system 110 may associate the users in the same ZIP+4 code with the same content objects. In an embodiment, ZIP+4 targeting system 110 may generate a content targeting list. The content targeting list may include the target user list along with the content objects associated with each of the user identifiers in the target user list.

Subsequent to the process described above, ZIP+4 targeting system 110 may provide the content objects to the users of the online services hosted by network based service provider 102. An example process 500 of providing the content objects to the users is described in conjunction with FIG. 5.

In the exemplary process described above, separate database queries are used at each step of the process. However, a person skilled in the art will appreciate that the above exemplary process may also be implemented by combining one or more of the separate queries.

Figure 4:
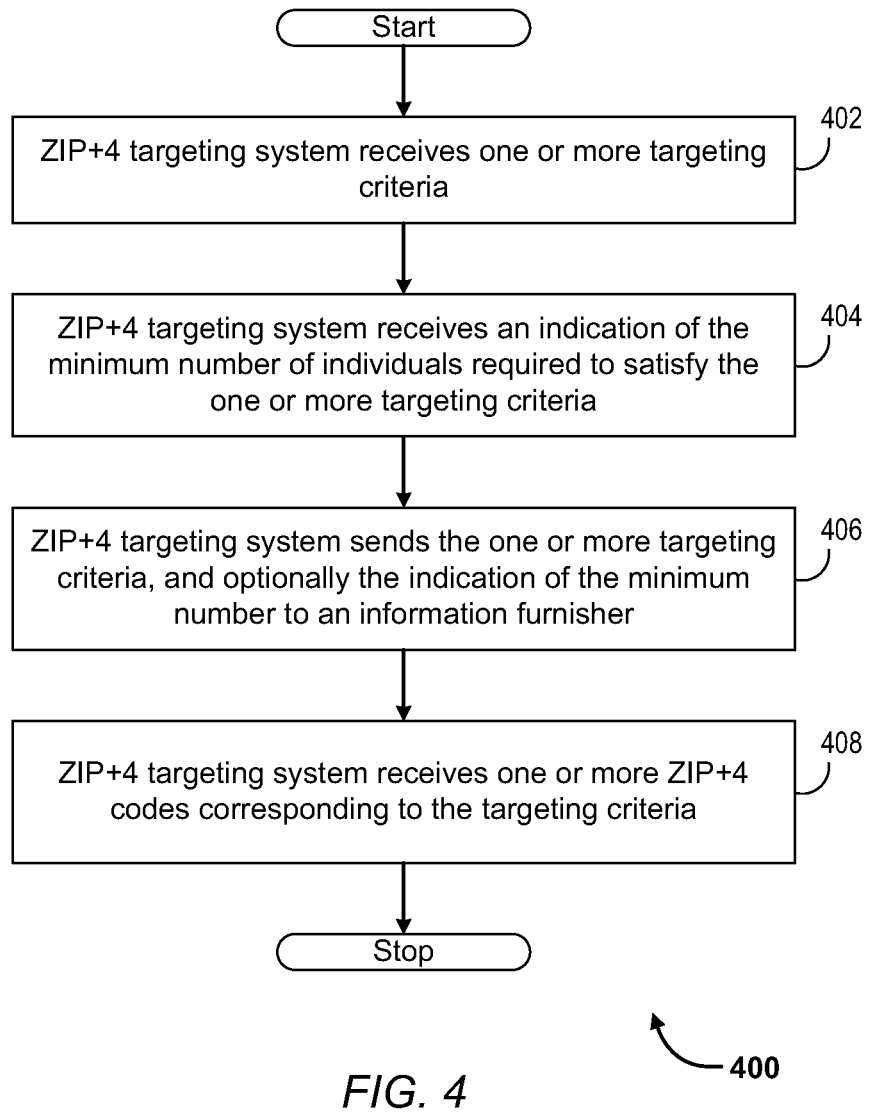
FIG. 4 is a flowchart illustrating an example method for retrieving ZIP+4 codes for targeted content delivery, according to one embodiment.

FIG. 4 is a flowchart illustrating an exemplary process 400 for retrieving ZIP+4 codes for targeted content delivery. Marketer(s) 116 not having a direct mail marketing campaign in place, or wishing to target certain market segments but not having ZIP+4 codes mapped onto the market segments, may send one or more targeting criteria to ZIP+4 targeting system 110.

At step 402, ZIP+4 targeting system 110 receives one or more targeting criteria. The targeting criteria may include market segments such as, but not limited to, demographic segments, psychographic segments, behavioral segments, and technographic segments. Exemplary targeting criteria may include, without limitation, "individuals earning between $100,000 and $150,000 annually", "individuals travelling to foreign countries at least once every year", "individuals that own dogs", "individuals buying Polo Ralph Lauren™ apparel", "individuals using portable electronic media players", and so forth.

At step 404, ZIP+4 targeting system 110 receives the match threshold, i.e. an indication of the minimum number of individuals required to satisfy the targeting criteria. The match threshold may be a number of households or individuals satisfying the targeting criteria, a ratio of households or individuals satisfying the targeting criteria to the total number of households or individuals in the ZIP+4 code, or a percentage of the number of households or individuals satisfying the targeting criteria.

At step 406, ZIP+4 targeting system 110 sends the targeting criteria to information furnisher(s) 112. Information furnisher(s) 112 may then correlate the received targeting criteria to one or more ZIP+4 codes. ZIP+4 targeting system 110 may optionally send the received match threshold, to information furnisher(s) 112. In this case, information furnisher(s) 112 may correlate the received targeting criteria, to one or more ZIP+4 codes, in conformance with the match threshold. Information furnisher(s) 112 may then send the one or more ZIP+4 codes to ZIP+4 targeting system 110.

At step 408, ZIP+4 targeting system 110 receives one or more ZIP+4 codes corresponding to the targeting criteria, from information furnisher(s) 112. ZIP+4 targeting system 110 may also receive the actual match number, i.e. the number of households or individuals matching the targeting criteria in each ZIP+4 code identified by information furnisher(s) 112. In the case that ZIP+4 targeting system 110 does not send the match threshold to information furnisher(s) 112, ZIP+4 targeting system 110 may select from the received one or more ZIP+4 codes, the ZIP+4 codes conforming with the match threshold, by comparing the match threshold and actual match numbers. ZIP+4 targeting system 110 selects the ZIP+4 codes having actual match numbers equal to or exceeding the match threshold.

Content Object Delivery

Figure 5:
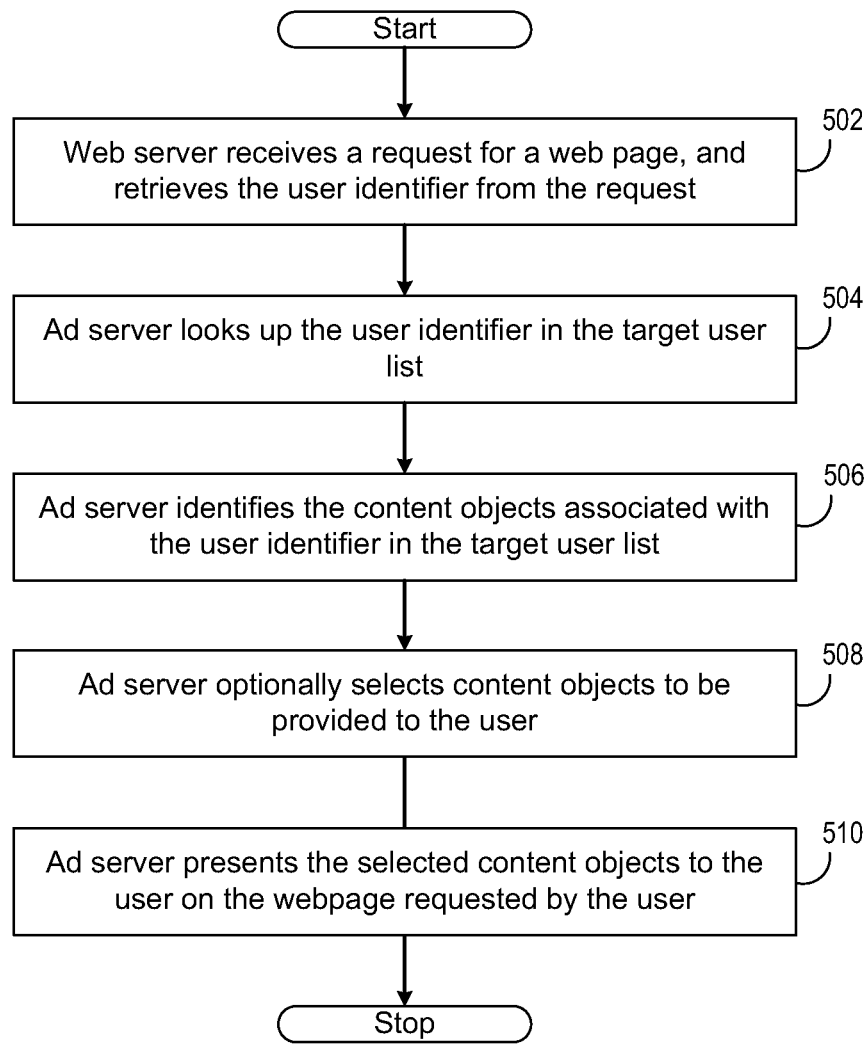
FIG. 5 is a flowchart illustrating an example method for selecting targeted ads.

Subsequent to compiling the target user list and associating the target user list with the content objects, ZIP+4 targeting system 110 may communicate with an ad server to present the content objects to the users, according to one embodiment. FIG. 5 is a flowchart of an example process 500 for selecting the content objects to be presented to the users.

At step 502, a web server of network based service provider 102 receives a request for a web page from a user. The request may be a standard HTTP request. The web server may also retrieve the user identifier of the user from the request for the web page. In some embodiments, the request includes a session identifier. The session identifier is used to identify a particular web session of the user. In other embodiments, cookies may store the user identifier of the user and may be used to identify the user. The web server may pass the user identifier to an ad server. In various embodiments, the ad server may have the target user list and the associated content objects stored thereon.

At step 504, the ad server looks up the target user list and determines whether the received user identifier is present in the target user list.

Responsive to determining that the received user identifier is present in the target user list, the ad server identifies, at step 506, the content objects associated with the user identifier. In an embodiment, the ad server may identify the content objects associated with the user identifier using the content targeting list. The ad server may identify multiple content objects associated with the user identifier.

At step 508, the ad server may optionally perform content object selection in the scenario that the ad server identified multiple content objects associated with the user identifier. The ad server may perform content object selection using any techniques for content targeting known in the art. For example, the ad server may select content objects based on the context or information of the web page. The ad server may select content objects in a sequential order, to provide substantially equal exposure to the content objects. The ad server may also select content objects based on the bid value of the content object in a pay-per-click or pay-per-view type of advertising model.

At step 510, after identifying the content objects associated with the user identifier, and the optional content object selection, the ad server presents the selected content objects to the user, on the web page requested by the user.

ZIP+4 Targeting System Architecture

Figure 6:
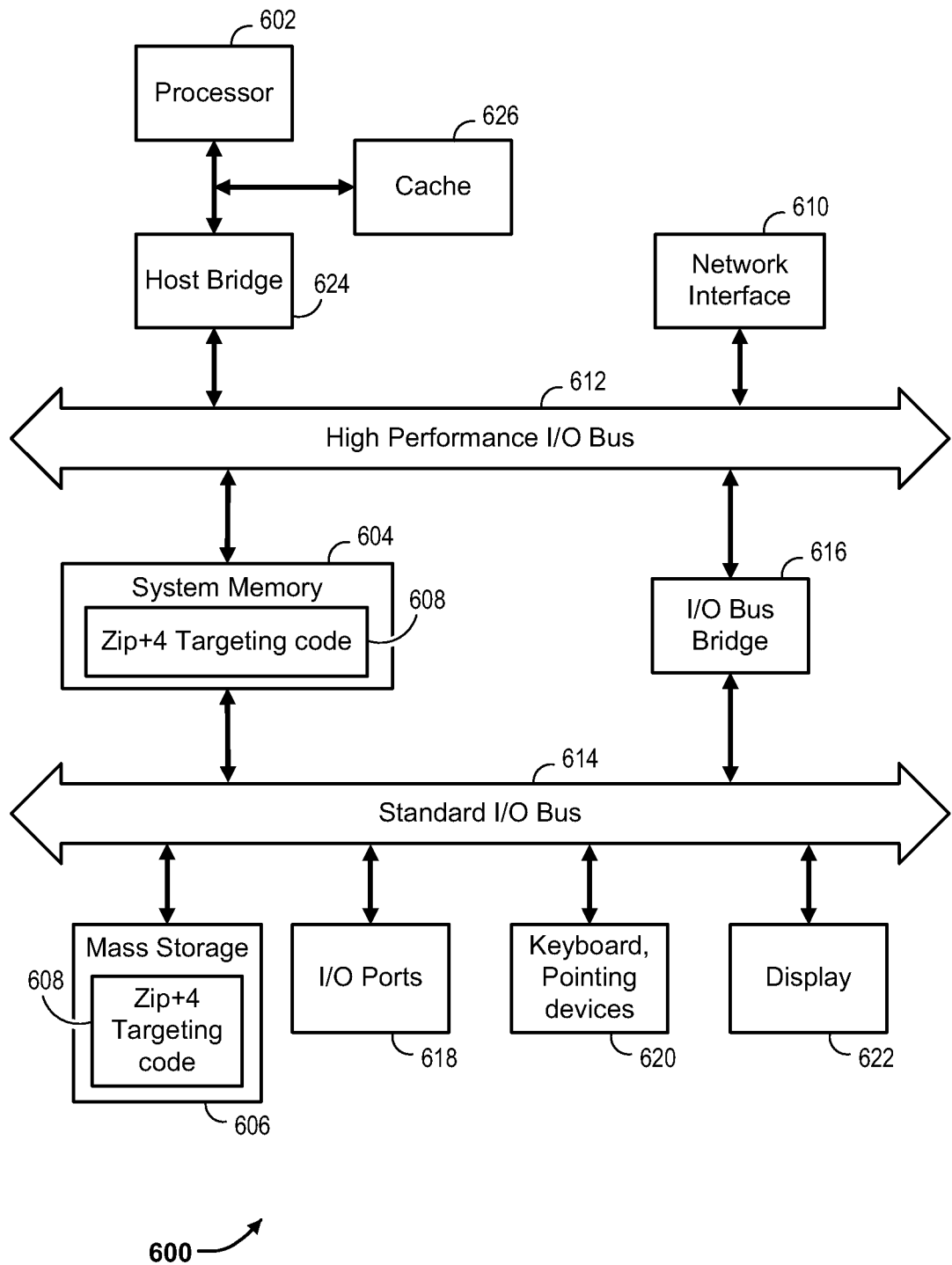
FIG. 6 is a schematic diagram illustrating an example computing system for targeting users for content provision according to one embodiment.

FIG. 6 illustrates an example hardware system 600 to implement ZIP+4 targeting system 110 according to one embodiment. Hardware system 600 includes at least one processor 602, a system memory 604, and mass storage 606. The system memory 604 has stored therein one or more application software, programming instructions 608 for implementing ZIP+4 targeting system 110, an operating system and drivers directed to the functions described herein. Mass storage 606 provides permanent storage for the data and programming instructions 608 for ZIP+4 targeting system 110, whereas system memory 604 (e.g., DRAM) provides temporary storage for the data and programming instructions when executed by processor 602. The process flow of the programming instructions 608 for ZIP+4 targeting system 110 is described in detail in conjunction with FIGS. 2, 3 and 4. In on embodiment, user information database 108 may reside in mass storage 606. A network/communication interface 610 provides communication between hardware system 600 and any of a wide range of networks, such as an Ethernet (e.g., IEEE 802.3) network, etc. Additionally, hardware system 600 includes a high performance input/output (I/O) bus 612 and a standard I/O bus 614. System memory 604 and network/communication interface 610 are coupled to bus 612. Mass storage 606 is coupled to bus 614. I/O Bus Bridge 616 couples the two buses 612 and 614 to each other.

In one embodiment, process 200, process 300 and process 400 described herein are implemented as a series of software routines run by hardware system 600. These software routines comprise a plurality or series of instructions to be executed by a processor in a hardware system, such as processor 602. Initially, the series of instructions are stored on a storage device, such as mass storage 606. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 610. The instructions are copied from the storage device, such as mass storage 606, into system memory 604 and then accessed and executed by processor 602.

In one embodiment, hardware system 600 may also include I/O ports 618, a keyboard and pointing device 620, a display 622 coupled to bus 612. I/O ports 618 are one or more serial and/or parallel communication ports that provide communication between additional peripheral devices, which may be coupled to hardware system 600. A host bridge 624 couples processor 602 to high performance I/O interface 610. Hardware system 600 may further include video memory (not shown) and a display device coupled to the video memory. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 600 may include a variety of system architectures; and various components of hardware system 600 may be rearranged. For example, cache 626 may be on-chip with processor 602. Alternatively, cache 626 and processor 602 may be packed together as a "processor module," with processor 602 being referred to as the "processor core." Furthermore, certain embodiments of the present invention may not require nor include all of the above components. For example, the peripheral devices shown coupled to standard I/O bus 612 may couple to high performance I/O interface 610. In addition, in some embodiments only a single bus may exist with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method for targeting users, the method comprising:
receiving, at a server, one or more content objects and one or more ZIP+4 codes as targeting parameters for the one or more content objects;
using one or more computers, retrieving personal information of a plurality of users;
using one or more computers, identifying one or more of the plurality of users located in geographic areas corresponding to the one or more ZIP+4 codes based, at least in part, on the personal information;
using one or more computers, compiling a target user list using the personal information and based on the one or more ZIP+4 codes; wherein the target user list comprises user identifiers of the one or more users;
using one or more computers, associating the target user list with the one or more content objects in a network addressable content targeting system by mapping the content objects to the user identifiers of the one or more users;
receiving one or more targeting criteria at a server;
sending the one or more targeting criteria to an information furnisher; and
responsive to sending the one or more targeting criteria, receiving the one or more ZIP+4 codes corresponding to the targeting criteria.

2. The method of claim 1, wherein the user identifier is one of an email address, a username, a screen name, a user identity (ID), an open ID Uniform Resource Locator (URL) and an alias name.

3. The method of claim 1, wherein the content object is one of an image, text, a video, a sound clip, an animated graphics interchange format (GIF) object, a flash object, a web page and a URL.

4. The method of claim 1 further comprising presenting the one or more content objects to the users comprised in the target user list based on the association of the target user list with the one or nr more object.

5. The method of claim 1, wherein each of the one or more ZIP+4 codes comprise at least a minimum number of individuals satisfying the one or more targeting criteria.

6. The method of claim 5 further comprising:
receiving, at the server, an indication of the minimum number of individuals required to satisfy the one or more targeting criteria in each of the one or more ZIP+4 codes; and
sending the indication to the information furnisher.

7. The method of claim 5, wherein the targeting criteria is one or more of demographic criteria, psychographic criteria, behavioral criteria and geographic criteria.

8. The method of claim 1, wherein mapping the content objects to the user identifiers of the one or more users is based on a commonality between the one or more ZIP+4 codes as targeting parameters and the one or more ZIP+4 codes associated with the geographic areas of the users.

9. The method of claim 1, further comprising selecting the content objects based on a context of the content objects indicated by metadata associated with the content objects and context of a web page requested by the user.

10. A system for targeting users for content provision, the system comprising:
one or more network interfaces;
at least one processor;
a memory; and
computer program code stored in a computer readable storage medium, wherein the computer program code, when executed, is operative to cause the at least one processor to:
receive at a server, one or more content objects and one or more ZIP+4 codes as targeting parameters for the one more content object;
retrieve personal information of a plurality of users;
identify one or more of the plurality of users located in geographic areas corresponding to the one or more ZIP+4 codes based, at least in part, on the personal information;
compile a target user list using the personal information and based on the one or more ZIP+4 codes; wherein the target user list comprises user identifiers of the one or more users;
associate the target user list with the one or more content objects in a network addressable content targeting system by mapping the content objects to the user identifiers of the one or more users;
receive one or more targeting criteria at a server;
send the one or more targeting criteria to an information furnisher; and
responsive to sending the one or more targeting criteria, receive the one or more ZIP+4 codes corresponding to the targeting criteria.

11. The system of claim 10, wherein the user identifier is one of an email address, a username, a screen name, a user identity (ID), an open ID Uniform Resource Locator (URL) and an alias name.

12. The system of claim 10, wherein the content object is one of an image, text, a video, a sound clip, an animated graphics interchange format (GIF) object, a flash object, a web page and a URL.

13. The system of claim 10, wherein the computer program code is further operative to present the one or more content objects to the users comprised in the target user list based on the association of the target user list with the one or more content objects.

14. The system of claim 10, wherein each of the one or more ZIP+4 codes comprise at least a minimum number of individuals satisfying the one or more targeting criteria.

15. The system of claim 14 wherein the computer program code is further operative to cause the at least one processor to:
receive, at the server, an indication of the minimum number of individuals required to satisfy the one or more targeting criteria in each of the one or more ZIP+4 codes; and
send the indication to the information furnisher.

16. The system of claim 14, wherein the targeting criteria is one or more of demographic criteria, psychographic criteria, behavioral criteria and geographic criteria.

17. A computer program product comprising a computer readable medium encoded with computer-executable instructions for targeting users for content provision, the computer-executable instructions, when executed, cause one or more processors to:
receive at a server, one or more content objects and one or more ZIP+4 codes as targeting parameters for the one or more content objects;
retrieve personal information of a plurality of users;
identify one or more of the plurality of users located in geographic areas corresponding to the one or more ZIP+4 codes based, at least in part, on the personal information;
compile a target user list using the personal information and based on the one or more ZIP+4 codes; wherein the target user list comprises user identifiers of the one or more users;
associate the target user list with the one or more content objects in a network addressable content targeting system by mapping the content objects to the user identifiers of the one or more users;
receive one or more targeting criteria at a server;
send the one or more targeting criteria to an information furnisher; and responsive corresponding the one or more targeting criteria, receive the one or more ZIP+4 codes corresponding to the targeting criteria.

18. The computer program product of claim 17, wherein the user identifier is one of an email address, a username, a screen name, a user identity (ID), an open ID Uniform Resource Locator (URL) and an alias name.

19. The method of claim 17, wherein the content object is one of an image, text, a video, a sound clip, an animated graphics interchange format (GIF) object, a flash object, a web page and a URL.

20. The computer program product of claim 17 further comprising computer-executable instructions operable to cause the one or more processors to present the one or more content objects to the users comprised in the target user list based on the association of the target user list with the one or more content objects.

21. The computer program product of claim 17, wherein each of the one or more ZIP+4 codes comprise at least a minimum number of individuals satisfying the one or more targeting criteria.

22. The computer program product of claim 21, wherein the computer program code is further operative to cause the at least one processor to:
receive, at the server, an indication of the minimum number of individuals required to satisfy the one or more targeting criteria in each of the one or more ZIP+4 code; and
send the indication to the information furnisher.

23. The computer program product of claim 21, wherein the targeting criteria is one or more of demographic criteria, psychographic criteria, behavioral criteria and geographic criteria.

* * * * *